(12) United States Patent
Nishikawa et al.

(10) Patent No.: US 12,071,288 B2
(45) Date of Patent: Aug. 27, 2024

(54) GAS BARRIER LAYERED BODY, AND PACKAGING MATERIAL AND TUBE CONTAINER USING SAME

(71) Applicant: TOPPAN INC., Tokyo (JP)

(72) Inventors: Takeshi Nishikawa, Tokyo (JP); Ayumi Tanaka, Tokyo (JP); Miki Fukugami, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 17/630,072

(22) PCT Filed: Jul. 22, 2020

(86) PCT No.: PCT/JP2020/028532
§ 371 (c)(1),
(2) Date: Jan. 25, 2022

(87) PCT Pub. No.: WO2021/020298
PCT Pub. Date: Feb. 4, 2021

(65) Prior Publication Data
US 2022/0267067 A1    Aug. 25, 2022

(30) Foreign Application Priority Data
Jul. 29, 2019 (WO) .............. PCT/JP2019/029680

(51) Int. Cl.
*B65D 65/40* (2006.01)
*B65D 47/06* (2006.01)
*C09D 167/02* (2006.01)

(52) U.S. Cl.
CPC ............. *B65D 65/40* (2013.01); *B65D 47/06* (2013.01); *C09D 167/02* (2013.01); *B65D 2565/385* (2013.01); *B65D 2565/387* (2013.01)

(58) Field of Classification Search
CPC ............................. B65D 65/40; C09D 167/02
See application file for complete search history.

(56) References Cited

U.S. PATENT DOCUMENTS

2016/0121365 A1    5/2016    Armstrong et al.

FOREIGN PATENT DOCUMENTS

| EP | 4 005 791 A1 | 6/2022 |
|---|---|---|
| JP | 2007-083409 A | 4/2007 |
| JP | 2008-142941 A | 6/2008 |
| JP | 2010-036350 A | 2/2010 |

(Continued)

OTHER PUBLICATIONS

English machine translation for JP2017202624. (Year: 2017).*

(Continued)

*Primary Examiner* — Michael C Miggins
(74) *Attorney, Agent, or Firm* — STAAS & HALSEY LLP (57) ABSTRACT

The present disclosure relates to a gas barrier layered body including: a substrate layer containing a polyolefin-based resin; a first polyvinyl alcohol-based resin layer; a Si or Al-containing thin film layer; and a second polyvinyl alcohol-based resin layer, in the stated order, in which a logarithmic decrement at 100° C. of the first polyvinyl alcohol-based resin layer as measured by a rigid-body pendulum type physical property testing instrument is 0.20 or less and a logarithmic decrement at 125° C. is 0.30 or less, and an indentation hardness of the second polyvinyl alcohol-based resin layer as determined by a nanoindenter is 0.5 to 1.0 GPa.

7 Claims, 3 Drawing Sheets

(56) References Cited

FOREIGN PATENT DOCUMENTS

| JP | 2013-049266 A | 3/2013 |
| JP | 2013-208901 A | 10/2013 |
| JP | 2015-208924 A | 11/2015 |
| JP | 2017-202624 A | 11/2017 |
| JP | 2019-034549 A | 3/2019 |

OTHER PUBLICATIONS

English machine translation for JP201036350. (Year: 2010).*
English machine translation for JP2008-142941. (Year: 2008).*
Notification of Transmittal of Translation of the International Preliminary Report on Patentability (Form PCT/IB/338; Form PCT/IB/373); dated Feb. 1, 2022 in corresponding PCT Application No. PCT/JP2019/029680 (2 pages).
Written Opinion (Form PCT/ISA/237); mailed Sep. 10, 2019 in PCT Application No. PCT/JP2019/029680 (6 pages).
Notification of Transmittal of Translation of the International Preliminary Report on Patentability (Form PCT/IB/338; Form PCT/IB/373); mailed Feb. 10, 2022 in corresponding PCT Application No. PCT/JP2020/028532 (2 pages).
Written Opinion (Form PCT/ISA/237); mailed Sep. 15, 2020 in corresponding PCT Application No. PCT/JP2020/028532; (4 pages) (4 pages English Translation).
International Search Report (Form PCT/ISA/210); mailed Sep. 15, 2020 in corresponding International Patent Application No. PCT/JP2020/028532 (3 pages) (2 pages English Translation).
European Search Report issued in European Application No. 20846741.5 dated Jun. 23, 2023.
Japanese Office Action issued in counterpart Japanese Application No. 2021-537006 dated Jun. 24, 2024.

* cited by examiner

GAS BARRIER LAYERED BODY, AND PACKAGING MATERIAL AND TUBE CONTAINER USING SAME

CROSS REFERENCE TO RELATED APPLICATIONS

This application is a U.S. National Stage Application under 35 U.S.C. § 371 of PCT International Patent Application No. PCT/JP2020/028532, filed on Jul. 22, 2020, which claims priority to PCT/JP2019/029680, filed on Jul. 29, 2019, in the Japan Patent Office, the contents of both International Patent Applications are incorporated by reference herein in their entirety.

TECHNICAL FIELD

The present disclosure relates to a gas barrier layered body, and a packaging material and a tube container that use the gas barrier layered body.

BACKGROUND ART

A gas barrier layered body in which a plastic film substrate and an inorganic compound layer formed of silicon oxide, aluminum oxide, magnesium oxide, or the like are combined has been widely used in packaging of articles requiring blocking of water vapor or various gases such as oxygen. Various improvements of such a gas barrier layered body have been investigated for the purpose of preventing a decrease in gas barrier properties and further improving barrier properties. For example, Patent Literature 1 discloses a gas-barrier laminate, comprising: a substrate comprising a polyethylene naphthalate layer; a layer formed of a composition comprising an acryl polyol and an isocyanate compound; and an inorganic thin film layer, arranged in the stated order.

CITATION LIST

Patent Literature

Patent Literature 1: Japanese Unexamined Patent Publication No. 2013-49266

SUMMARY OF INVENTION

Technical Problem

However, in recent years, due to the growing awareness of environmental problems triggered by plastic wastes in the seas and oceans, it has been required to further increase the efficiency of sorting/recovery and recycling of plastic materials. That is, conventionally, even in a flexible packaging material whose high performance has been attained by combining various heterogeneous materials, the mono-material formation has been demanded. However, it is the current situation that, if mono-material formation is attained by using a polyolefin-based resin, it is difficult to obtain favorable barrier properties and hot-water treatment resistance.

The present disclosure provides a polyolefin-based gas barrier layered body that is useful for attaining excellent recyclability of a packaging material and has excellent gas barrier properties. The present disclosure provides a packaging material and a tube container that use this gas barrier layered body.

Solution to Problem

An aspect of the present disclosure provides a gas barrier layered body including: a substrate layer; a first polyvinyl alcohol-based resin layer; a Si or Al-containing thin film layer; and a second polyvinyl alcohol-based resin layer, in the stated order. In this gas barrier layered body, the substrate layer contains a polyolefin-based resin, a logarithmic decrement at 100° C. of a surface of the first polyvinyl alcohol-based resin layer on a side that is in contact with the Si or Al-containing thin film layer as measured by a rigid-body pendulum type physical property testing instrument is 0.20 or less and a logarithmic decrement at 125° C. is 0.30 or less, and an indentation hardness of a surface of the second polyvinyl alcohol-based resin layer as determined by a nanoindenter is 0.5 to 1.0 GPa. The polyolefin-based resin has generally lower barrier properties as a substrate than a polyester-based resin such as PET and is soft, so that the polyolefin-based resin is likely to deteriorate in the course of processing or sterilization. On the other hand, the above-described gas barrier layered body has the Si or Al-containing thin film layer sandwiched (interposed) between the first and second polyvinyl alcohol-based resin layers on the polyolefin substrate, and thereby the gas barrier layered body has excellent gas barrier properties. Moreover, since the polyvinyl alcohol-based resin layer itself has predetermined physical properties, for example, even when a sterilization treatment is performed at a high temperature of 100° C. or higher, the thin film layer held on the soft polyolefin substrate is protected, and barrier properties can be maintained even after the sterilization treatment.

Another aspect of the present disclosure provides a packaging material including: the above-described gas barrier layered body; and a sealant layer provided on a surface of the gas barrier layered body on a side opposite to the substrate layer.

Still another aspect of the present disclosure provides a tube container including: a tubular body portion having one blocked end; and a spout portion attached to the other end of the body portion, in which the body portion is configured by a film including the above-described gas barrier layered body and a non-stretched polyolefin layer.

Since the above-described gas barrier layered body achieves excellent gas barrier properties by a sandwich structure attributable to the polyvinyl alcohol-based resin layers, a range of choices for a resin material constituting the substrate layer can be expanded. Therefore, there is an advantage that it is easy to make a resin material constituting the substrate layer and a resin material constituting the sealant layer coincide with each other. For example, by concurrently using the substrate layer formed of the polyolefin-based resin and the sealant layer formed of the polyolefin-based resin, the mono-material formation of the packaging material can be attained. Note that, in the present disclosure, a mono-material packaging material refers to a packaging material in which a mass ratio of a specific material (for example, a polyolefin-based resin) is 90% by mass or more.

Advantageous Effects of Invention

According to the present disclosure, there is provided a polyolefin-based gas barrier layered body that is useful for attaining excellent recyclability of a packaging material and has excellent gas barrier properties. According to the present disclosure, there are provided a packaging material and a tube container that use this gas barrier layered body.

DESCRIPTION OF EMBODIMENTS

Hereinafter, preferred embodiments of the present disclosure will be described in detail occasionally with reference to the drawings. Note that, in the drawings, the same or corresponding parts are designated by the same reference signs, and redundant description will be omitted. Furthermore, the dimensional ratios in the drawings are not limited to ratios illustrated in the drawings.

<Gas Barrier Layered Body>

Figure 1:
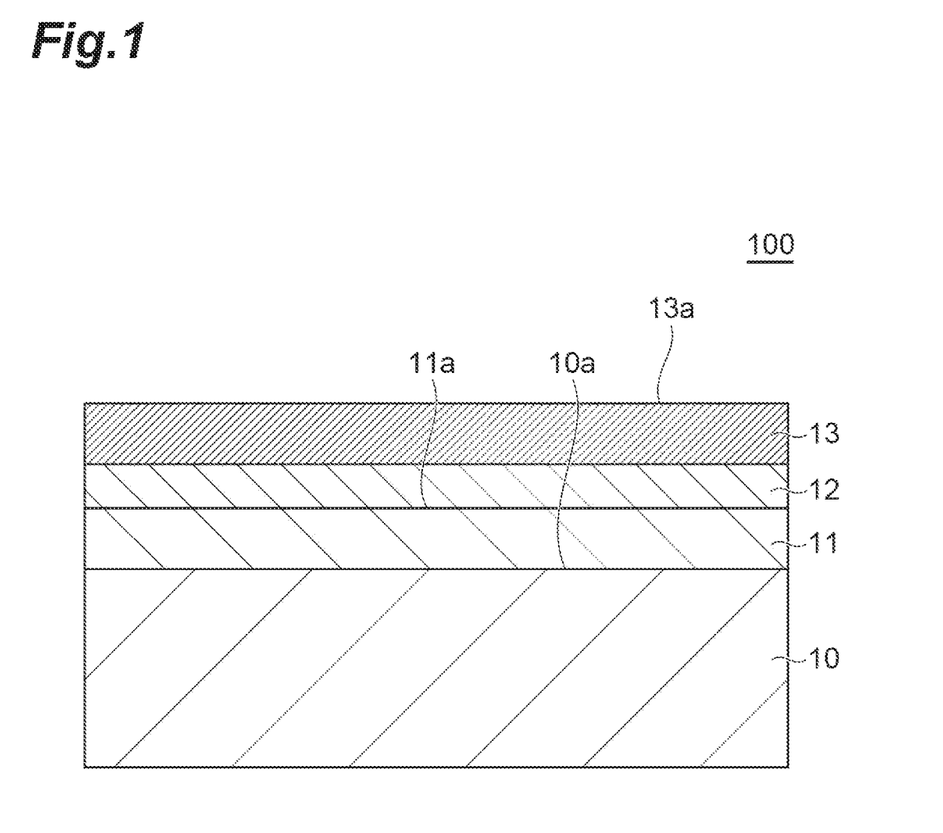
FIG. 1 is a schematic cross-sectional view illustrating a layered body according to an embodiment.

FIG. 1 is a schematic cross-sectional view illustrating a gas barrier layered body according to an embodiment. A gas barrier layered body 100 illustrated in FIG. 1 includes a substrate layer 10, a first polyvinyl alcohol-based resin layer 11, a Si or Al-containing thin film layer 12, and a second polyvinyl alcohol-based resin layer 13, in the stated order.

(Substrate Layer)

The substrate layer is a film serving as a support body and contains a polyolefin-based resin.

Examples of the polyolefin-based resin include polyethylene (PE), polypropylene (PP), polybutene (PB), and a cycloolefin polymer. Furthermore, examples of the polyolefin-based resin include acid-modified polyolefins obtained through graft modification of polyolefin using unsaturated carboxylic acids, acid anhydrides of unsaturated carboxylic acids, and esters of unsaturated carboxylic acids. As a raw material monomer at the time of synthesis of polypropylene, a small amount of the second, third, and other components such as ethylene and butene may be used. From the viewpoint of excellent heat resistance, a propylene monopolymer film can be used as the substrate layer.

The film constituting the substrate layer may be a stretched film or a non-stretched film. However, from the viewpoint of impact resistance, heat resistance, water resistance, dimension stability, and the like, the film constituting the substrate layer may be a stretched film. A stretching method is not particularly limited, and any method such as stretching by inflation or uniaxially or biaxially stretching may be employed as long as a film with a stable dimension can be supplied.

The thickness of the substrate layer is not particularly limited, and from the viewpoint of obtaining excellent impact resistance and excellent gas barrier properties, the thickness can be set to 9 to 100 μm and may be 15 to 30 μm.

The laminating surface of the film constituting the substrate layer may be subjected to various pre-treatments such as a corona treatment, a plasma treatment, and a flame treatment in a range that the barrier performance is not impaired, or may be provided with a coat layer such as an adhesion-facilitating layer.

An additive such as an antistatic agent, an ultraviolet absorber, a plasticizer, or a slipping agent may be contained as necessary in the film constituting the substrate layer.

(First Polyvinyl Alcohol-Based Resin Layer)

Any polyvinyl alcohol-based resin may be used as long as it has a vinyl alcohol unit obtained by saponifying a vinyl ester unit, and examples thereof include polyvinyl alcohol (PVA) and an ethylene-vinyl alcohol copolymer (EVOH). From the viewpoint of heat resistance and gas barrier properties, EVOH can be suitably used.

Examples of the PVA include resins obtained by polymerizing a vinyl ester, such as vinyl acetate, vinyl formate, vinyl propionate, vinyl valerate, vinyl caprate, vinyl laurate, vinyl stearate, vinyl pivalate, or vinyl versatate, alone and then saponifying the resultant polymer.

The PVA may be a modified PVA that is subjected to copolymerization modification or post-modification. The copolymerization-modified PVA is obtained, for example, by copolymerizing a vinyl ester and an unsaturated monomer copolymerizable with the vinyl ester and then saponifying the resulting copolymer. The post-modified PVA is obtained by copolymerizing an unsaturated monomer with PVA, which is obtained by polymerizing a vinyl ester and then saponifying the resulting polymer, in the presence of a polymerization catalyst. The modification degree in the modified PVA can be set to less than 50 mol % from the viewpoint of exhibiting sufficient gas barrier properties and can be set to 10 mol % or more from the viewpoint of obtaining the effect by modification.

Examples of the above-described unsaturated monomer include olefins such as ethylene, propylene, isobutylene, α-octene, α-dodecene, and α-octadecene; hydroxyl group-containing α-olefins such as 3-buten-1-ol, 4-pentyn-1-ol, and 5-hexen-1-ol; unsaturated acids such as acrylic acid, methacrylic acid, crotonic acid, maleic acid, maleic anhydride, itaconic acid, and undecylenic acid; nitriles such as acrylonitrile and methacrylonitrile; amides such as diacetone acrylamide, acrylamide, and methacrylamide; olefin sulfonic acids such as ethylene sulfonic acid, allyl sulfonic acid, and methallyl sulfonic acid; vinyl compounds such as alkyl vinyl ether, dimethylallyl vinyl ketone, N-vinylpyrrolidone, vinyl chloride, vinylethylene carbonate, 2,2-dialkyl-4-vinyl-1,3-dioxolane, glycerin monoallyl ether, and 3,4-diacetoxy-1-butene; and vinylidene chloride, 1,4-diacetoxy-2-butene, vinylene carbonate, polyoxypropylene, and polyoxypropylene vinylamine From the viewpoint of gas barrier properties, the unsaturated monomer can be olefin and may be particularly ethylene.

Examples of the polymerization catalyst include radical polymerization catalysts such as azobisisobutyronitrile, benzoyl peroxide, and lauryl peroxide. A polymerization method is not particularly limited, and bulk polymerization, emulsion polymerization, solvent polymerization, and the like can be employed.

The polymerization degree of the PVA is preferably 300 to 3000. When the polymerization degree is less than 300, barrier properties are likely to decrease, and when the polymerization degree is more than 3000, the viscosity is too high, so that coating suitability is likely to decrease. The saponification degree of the PVA is preferably 80 mol % or more, more preferably 90 mol % or more, and further preferably 98 mol % or more. Furthermore, the saponification degree of the PVA may be 100 mol % or less or 99.9 mol % or less. The polymerization degree and the saponification degree of the PVA can be measured according to methods described in JIS K 6726 (1994).

Examples of the EVOH is generally obtained by saponifying a copolymer of ethylene and an acid vinyl ester such as vinyl acetate, vinyl formate, vinyl propionate, vinyl valerate, vinyl caprate, vinyl laurate, vinyl stearate, vinyl pivalate, or vinyl versatate.

The ethylene unit content of the EVOH is 10 mol % or more, more preferably 15 mol % or more, further preferably 20 mol % or more, and particularly preferably more than 35 mol %. Furthermore, the ethylene unit content of the EVOH is preferably 65 mol % or less, more preferably 55 mol % or less, and further preferably less than 50 mol %. When the ethylene unit content is 10 mol % or more, gas barrier properties or dimension stability at a high humidity can be satisfactorily maintained. On the other hand, when the ethylene unit content is 65 mol % or less, gas barrier properties can be enhanced. The ethylene unit content of the EVOH can be obtained by the NMR method.

The saponification can be performed with alkali or acid, but from the viewpoint of a saponification rate, alkali can be used. Examples of the alkali include alkali metal hydroxides such as sodium hydroxide and potassium hydroxide, and alkali metal alkoxides such as sodium ethylate, potassium ethylate, and lithium methylate.

The thickness of the first polyvinyl alcohol-based resin layer is not particularly limited, and from the viewpoint of barrier properties and processing suitability, the thickness can be set to 0.05 to 5 μm and may be 0.1 to 2 μm or 0.3 to 1 μm.

The mass per unit area of the first polyvinyl alcohol-based resin layer can be set to 0.1 to 10 g/m². When this mass is 0.1 g/m² or more, a surface 11a of the first polyvinyl alcohol-based resin layer can be sufficiently smoothly formed even if the smoothness of a surface 10a of the substrate layer is not sufficient, and a Si or Al-containing thin film layer having excellent gas barrier properties can be formed on the surface 11a. On the other hand, this mass being 10 g/m² or less is advantageous in terms of attainment of the mono-material formation of the packaging material and a reduce in material cost.

The surface roughness Sa of the surface 11a of the first polyvinyl alcohol-based resin layer can be set, for example, to 0.2 μm or less, and may be 0.01 to 0.1 μm or 0.02 to 0.1 μm. When the surface roughness Sa of the surface 11a is 0.2 μm or less, a Si or Al-containing thin film layer having excellent gas barrier properties can be formed on the surface 11a. On the other hand, when the surface roughness Sa of the surface 11a is 0.01 μm or more, as compared to a case where the surface roughness Sa is less than 0.01 μm, the adhesion between the first polyvinyl alcohol-based resin layer and the Si or Al-containing thin film layer can be improved by the anchor effect. The value of the surface roughness Sa described herein means a value that is measured by using VertScan (manufactured by Ryoka Systems Inc.).

Note that, according to studies of the present inventors, for example, in a case where a propylene monopolymer film (monopolymer layer) is used as the substrate layer, the propylene monopolymer film has excellent heat resistance, whereas the surface thereof is likely to become a leaf-vein-like form, which is a drawback. Therefore, even when the Si or Al-containing thin film layer is formed directly on the surface of the propylene monopolymer film, sufficient barrier properties cannot be achieved. In this regard, by interposing the polyvinyl alcohol-based resin layer between the propylene monopolymer film and the Si or Al-containing thin film layer, excellent gas barrier properties can be achieved. A mono-material packaging material can be produced by concurrently using a propylene monopolymer film as the substrate layer and a polypropylene-based resin film as the sealant layer.

The logarithmic decrement at 100° C. of the surface 11a of the first polyvinyl alcohol-based resin layer as measured by a rigid-body pendulum type physical property testing instrument is 0.20 or less, and may be 0.18 or less or 0.15 or less, from the viewpoint of achieving excellent oxygen barrier properties. The lower limit of this logarithmic decrement is not particularly limited, but the lower limit thereof can be set to 0.01 or more from the viewpoint of suppressing the cracking of a film during a sterilization treatment caused when the film is excessively hardened and may be 0.1 or more from the viewpoint of easily maintaining excellent oxygen barrier properties. Furthermore, the logarithmic decrement at 125° C. of the surface 11a of the first polyvinyl alcohol-based resin layer as measured by a rigid-body pendulum type physical property testing instrument is 0.30 or less, and may be 0.28 or less or 0.25 or less, from the viewpoint of achieving excellent oxygen barrier properties. The lower limit of this logarithmic decrement is not particularly limited, but the lower limit thereof can be set to 0.01 or more from the viewpoint of suppressing the cracking of a film during a sterilization treatment caused when the film is excessively hardened and may be 0.1 or more from the viewpoint of easily maintaining excellent oxygen barrier properties. This logarithmic decrement can be measured by a rigid body pendulum method, for example, using a rigid-body pendulum type physical property testing instrument RPT-3000W manufactured by A&D Company, Limited. Measurement is performed using RBP-020 as a pipe edge while heating from 30° C. to 130° C. at a temperature increase rate of 10° C./min. The measurement at three places is performed under this condition, and each of average values of the logarithmic decrement at 100° C. and 125° C. is calculated. Small logarithmic decrement means that the resin molecule constituting the surface of the measurement target is less likely to move due to a thermal influence.

(Si or Al-Containing Thin Film Layer)

Examples of a Si or Al (atom)-containing compound contained in the Si or Al-containing thin film layer include metal oxides such as silicon oxide (SiOx) and aluminum oxide (AlOx), metallic aluminum (Al), silicon nitride (SiN), and silicon oxynitride (SiON). From the viewpoint of transparency and barrier properties, the Si or Al-containing compound can be aluminum oxide and silicon oxide. Furthermore, from the viewpoint of excellent tensile stretchability at the time of processing, the Si or Al-containing compound may be silicon oxide. By using the Si or Al-containing thin film layer, high barrier properties can be obtained while suppressing the thickness.

The layer thickness of the Si or Al-containing thin film layer can be set to 5 to 80 nm. When the layer thickness is 5 nm or more, sufficient gas barrier properties are easily obtained. Furthermore, when the layer thickness is 80 nm or less, occurrence of cracks due to the deformation of the thin film by the internal stress is suppressed, and deterioration of gas barrier properties is easily suppressed. Note that, when the layer thickness exceeds 80 nm, cost is likely to increase due to an increase in material use amount, an increase in time for film formation, and the like, which is not preferable also from the economic viewpoint. From the above-described viewpoints, the layer thickness of the Si or Al-containing thin film layer may be 10 to 50 nm or 20 to 40 nm.

(Second Polyvinyl Alcohol-Based Resin Layer)

Regarding the polyvinyl alcohol-based resin constituting the second polyvinyl alcohol-based resin layer, the content described in the section of the first polyvinyl alcohol-based resin layer can be referred to.

The second polyvinyl alcohol-based resin layer may contain Si. Specifically, the second polyvinyl alcohol-based resin layer may be a cured product of a raw material containing a polyvinyl alcohol-based resin and a silane compound. Examples of the silane compound include tetraalkoxysilane such as tetramethoxysilane and tetraethoxysilane, and silazane such as hexamethyldisilazane. As the silane compound, a compound generally used as a silane coupling agent or a polysiloxane compound having a siloxane bond may be used. Examples of the silane coupling agent include epoxysilane (such as glycidoxypropyltrimethoxysilane), (meth)acrylsilane (such as acryloxypropyltrimethoxysilane), aminosilane, ureidosilane, isocyanatosilane, isocyanuratesilane (such as tris(3-trialkoxysilylpropyl) isocyanurate), and mercaptosilane.

When the second polyvinyl alcohol-based resin layer is formed, the amount of the silane compound in the raw material can be set to 0.3 to 5.0 parts by mass with respect to 1 part by mass of the polyvinyl alcohol-based resin, and may be 0.4 to 4.5 parts by mass or 0.5 to 4.0 parts by mass, from the viewpoint of maintaining adhesion with the Si or Al-containing thin film layer and gas barrier properties.

The thickness of the second polyvinyl alcohol-based resin layer is not particularly limited, and from the viewpoint of barrier properties and processing suitability, the thickness can be set to 0.05 to 2 μm and may be 0.1 to 0.6 μm or 0.2 to 0.5 μm.

The indentation hardness of a surface 13a of the second polyvinyl alcohol-based resin layer, that is, a surface on a side that is not in contact with the Si or Al-containing thin film layer as determined by a nanoindenter is 0.5 to 1.0 GPa, and may be 0.65 to 0.95 GPa or 0.8 to 0.9 GPa, from the viewpoint of achieving excellent oxygen barrier properties.

<Method for Producing Gas Barrier Layered Body>

The gas barrier layered body can be produced, for example, by a production method including: a step of forming a first polyvinyl alcohol-based resin layer on a substrate layer, a step of forming a Si or Al-containing thin film layer on the first polyvinyl alcohol-based resin layer, and a step of forming a second polyvinyl alcohol-based resin layer on the Si or Al-containing thin film layer.

(Step of Forming First Polyvinyl Alcohol-Based Resin Layer)

In this step, a coating solution containing a polyvinyl alcohol-based resin and a fluid medium can be used. This coating solution can be obtained, for example, by dissolving a polyvinyl alcohol-based resin powder obtained by synthesis in a fluid medium. Examples of the fluid medium include water, dimethylsulfoxide, dimethylformamide, dimethylacetamide, N-methylpyrrolidone, various glycols, polyhydric alcohols such as trimethylol propane, and amines such as ethylenediamine and diethylenetriamine. These may be used alone or in combination of two or more kinds thereof. From the viewpoint of environmental load reduction and the like, water can be used as the fluid medium. In this case, a coating solution can be obtained by dissolving a polyvinyl alcohol-based resin powder in water set at a high temperature (for example, 80° C.).

The content of the polyvinyl alcohol-based resin (solid content) in the coating solution can be set to 3 to 20% by mass from the viewpoint of maintaining favorable coating properties.

An additive such as isocyanate or polyethylenimine may be contained in the coating solution in order to improve adhesion. Furthermore, an additive such as a preservative, a plasticizer, alcohol, or a surfactant may be contained in the coating solution.

Coating of the coating solution to the substrate layer can be performed by any appropriate method. The coating of the coating solution can be performed, for example, by a wet film formation method such as a gravure coater, a dip coater, a reverse coater, a wire bar coater, or a die coater. The coating temperature and the drying temperature of the coating solution are not particularly limited, and for example, can be set to 50° C. or higher.

The first polyvinyl alcohol-based resin layer may be formed on the substrate layer by an extrusion method. In the case of extrusion, multilayer extrusion using a T die can be employed. As an adhesive that can be used at the time of extrusion, for example, a maleic anhydride-modified polypropylene resin is exemplified.

An adhesion layer may be formed in advance on the substrate layer by coating the above-described adhesive component onto the substrate layer and then drying the adhesive component.

The thickness of the adhesion layer can be set to 0.1 to 50 μm and may be 0.5 to 20 μm from the viewpoint of adhesiveness, conformability, processability, and the like.

(Step of Forming Si or Al-Containing Thin Film Layer)

A Si or Al-containing thin film layer can be formed, for example, by vacuum film formation. In the vacuum film formation, a physical vapor deposition method or a chemical vapor deposition method can be used. Examples of the physical vapor deposition method include, but are not limited to, a vacuum deposition method, a sputtering method, and an ion plating method. Examples of the chemical vapor deposition method include, but are not limited to, a thermal CVD method, a plasma CVD method, and a photo CVD method.

In the vacuum film formation, a resistive heating type vacuum deposition method, an electron beam (EB) heating type vacuum deposition method, an induction heating type vacuum deposition method, a sputtering method, a reactive sputtering method, a dual-magnetron sputtering method, a plasma chemical vapor deposition method (PECVD method), and the like are particularly preferably used. However, in consideration of productivity, a vacuum deposition method is most excellent at the moment. As a heating means in the vacuum deposition method, any of an electron beam heating method, a resistive heating method, and an induction heating method is preferably used.

(Step of Forming Second Polyvinyl Alcohol-Based Resin Layer)

In this step, a coating solution can be used similarly to the step of forming the first polyvinyl alcohol-based resin layer. Regarding the coating solution, the content described in the section of the step of forming the first polyvinyl alcohol-based resin layer can be referred to.

The coating solution for forming the second polyvinyl alcohol-based resin layer may contain a silane compound. The content of the silane compound in the coating solution may be adjusted so that a desired amount of the silane compound is contained with respect to the amount of the polyvinyl alcohol-based resin.

In a case where the silane compound is contained in the coating solution, the coating solution may further contain an acid catalyst, an alkali catalyst, a photopolymerization initiator, or the like.

<Packaging Material>

Figure 2:
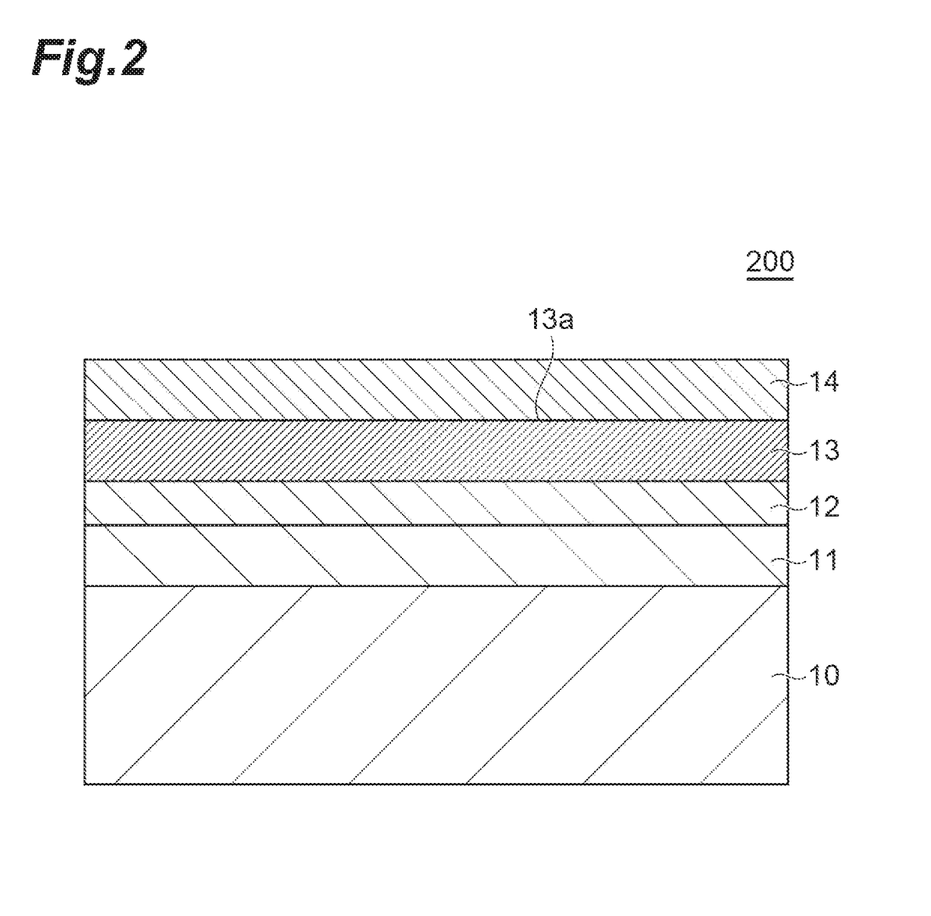
FIG. 2 is a schematic cross-sectional view illustrating a packaging material according to an embodiment.
Figure 3:
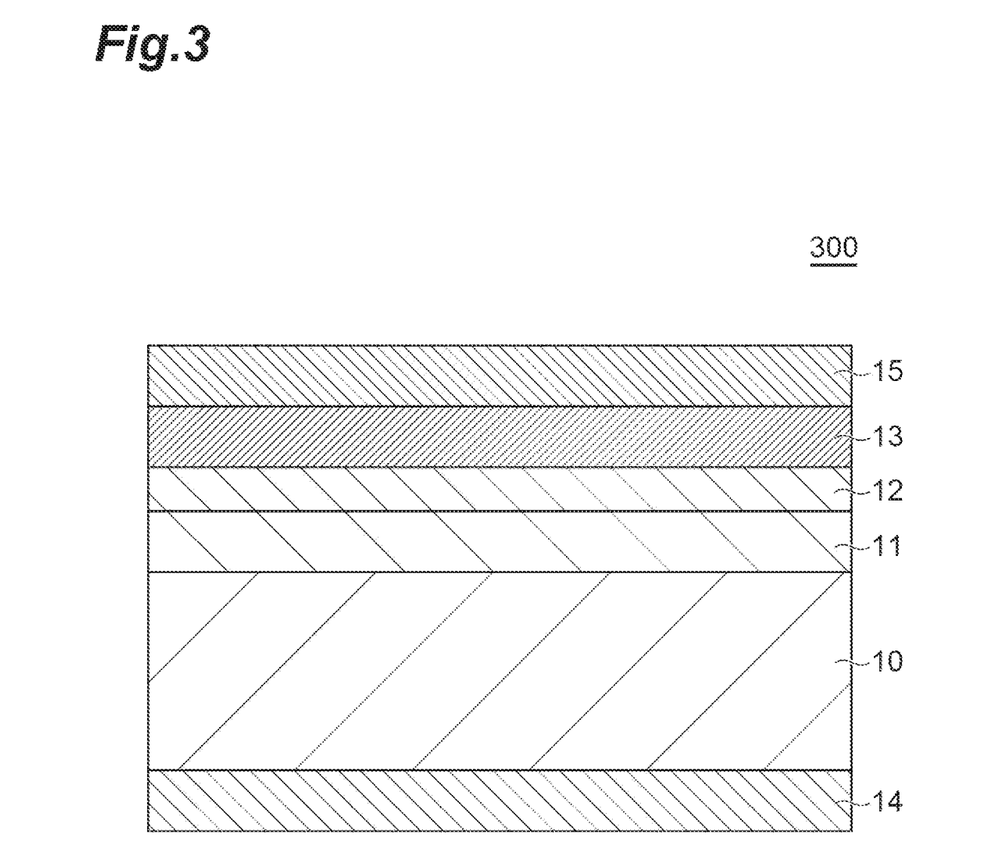
FIG. 3 is a schematic cross-sectional view illustrating a packaging material according to an embodiment.

A packaging material includes the above-described gas barrier layered body and a sealant layer provided on a surface of the gas barrier layered body. Examples of the sealant layer include layers containing a polyolefin-based resin or a polyester-based resin. FIGS. 2 and 3 are schematic cross-sectional views illustrating a packaging material according to an embodiment.

A packaging material 200 illustrated in FIG. 2 includes the gas barrier layered body 100 and a sealant layer 14 provided on a surface of the gas barrier layered body 100 on a side opposite to the substrate layer (on the surface 13a of the second polyvinyl alcohol-based resin layer). For example, in a case where both the substrate layer 10 and the sealant layer 14 are formed of a polyolefin-based resin, the content percentage of the polyolefin-based resin can be set to 90% by mass or more (preferably 95% by mass or more) based on the total mass of the packaging material 200. Such a packaging material 200 can attain the mono-material formation.

In the above-describe embodiment, the packaging material 200 in which the sealant layer 14 is pasted to the surface of the gas barrier layered body 100 on the barrier layer side has been exemplified, but the sealant layer 14 may be pasted to the surface of the gas barrier layered body 100 on the substrate layer 10 side (see FIG. 3). A packaging material 300 illustrated in FIG. 3 has a configuration in which the gas barrier layered body 100 on the barrier layer side faces a general OPP film 15 (a printed substrate or the like) and the sealant layer 14 is stuck on the gas barrier layered body 100 on the substrate layer 10 side.

<Tube Container>

The above-described gas barrier layered body can also be used in a tube container. Specifically, in a tube container including a tubular body portion having one blocked end and a spout portion attached to the other end of the body portion, by using a film including the above-described gas barrier layered body and a non-stretched polyolefin layer in the body portion, the body portion is almost configured by a polyolefin, and a tube container further having barrier properties can be obtained. As a general tube container, a film in which the above-described gas barrier layered body is interposed between non-stretched polyolefin layers is used in a body portion.

The thickness of the film constituting the body portion can be set, for example, to 30 to 300 μm. As materials for the substrate of the gas barrier layered body and the non-stretched polyolefin, a polypropylene is preferred from the viewpoint of heat resistance. At this time, when a resin material containing a polypropylene as a main component that is the same resin as in the substrate is selected as a material for the spout portion, a recycling treatment can be performed without sorting out the tube container main body, which is preferable.

EXAMPLES

Hereinafter, the present disclosure will be described in more detail by means of Experimental Examples; however, the present disclosure is not limited to these Experimental Examples.

<Production of Layered Body>

The following films were prepared as the substrate layer.
PET film: P60 (manufactured by Toray Industries, Inc., thickness: 12 μm)
OPP film A: M-1 (manufactured by Mitsui Chemicals Tohcello, Inc., thickness: 20 μm)
OPP film B: Film obtained by co-extruding Prime Polypro that is a homopolypropylene resin (manufactured by Prime Polymer Co., Ltd., thickness: 18 μm) and Adhesive Resin ADMER (manufactured by Mitsui Chemicals, Inc., thickness: 1 μm)
PE film: Stretching high-density polyethylene film (manufactured by Tokyo Printing Ink Mfg. Co., Ltd., trade name: SMUQ, thickness: 25 μm)

The following coating solutions were prepared as the coating solution.

PVA coating solution: JF-05 (manufactured by JAPAN VAM & POVAL CO., LTD.)

PVA coating solution (containing TEOS): Coating solution obtained by mixing TEOS with JF-05. The mixing amount was adjusted so that the mass ratio of the polyvinyl alcohol-based resin and the TEOS became a value shown in the table.

Ethylene-modified PVA coating solution: EXCEVAL RS2817SB (manufactured by Kuraray Co., Ltd.)

EVOH Coating Solution

Polyurethane coating solution: TAKENATE A65 (manufactured by Mitsui Chemicals, Inc.)

Experimental Example 1

The PVA coating solution was coated onto the surface of a PET film (first layer: the substrate layer) and then dried to thereby form a PVA layer (second layer: the first polyvinyl alcohol-based resin layer). The mass per unit area of the PVA layer was 0.5 g/m$^2$. The thickness of the PVA layer was 0.5 μm. The surface roughness Sa of the surface of the PVA layer was 0.32 μm. The value of the surface roughness Sa was measured by using VertScan (manufactured by Ryoka Systems Inc.)

A SiOx film (third layer) was formed on the surface of the PVA layer by using a vacuum deposition apparatus using an electron beam heating method. That is, a SiO vapor deposition material was vaporized by electron beam heating to form a SiOx film (thickness: 30 nm).

Next, a PVA layer containing Si (fourth layer: the second polyvinyl alcohol-based resin layer) was formed on the surface of the SiOx film. Specifically, TEOS, methanol, and hydrochloric acid (0.1 N) were mixed so that the mass ratio became 18/10/72, and thus a hydrolyzed solution (TEOS-containing solution) was obtained. An aqueous solution of 5% PVA and the TEOS-containing solution were mixed so that the mass ratio of the PVA and the TEOS became 6/4, thereby preparing a coating solution. This coating solution was coated to the surface of the SiOx film and then dried to thereby form a PVA layer containing Si. The mass per unit area of the PVA layer containing Si was 0.3 g/m$^2$. The thickness of the PVA layer containing Si was 0.3 μm.

In Table 1, the logarithmic decrement of the surface of the second layer on the third layer side was measured by a rigid body pendulum method (a rigid-body pendulum type physical property testing instrument RPT-3000W manufactured by A&D Company).

In Table 1, the indentation hardness of the surface of the fourth layer on a side opposite to the third layer was measured by a nanoindenter according to the following measurement conditions. In the measurement, a sample was fixed while keeping the sample horizontal with an epoxy-based adhesive.

(Measurement Conditions)
Control mode: Displacement control
Indentation depth: 30 nm
Indentation time: 1 s, Retention time: 1 s, Drawing time: 1 s
Number of measurement points: 30 points (5 places×3 points×2 sets)
Measurement interval: 50 μm Experimental Example 2

A layered body was obtained in the same manner as in Experimental Example 1, except that the OPP film A was used instead of the PET film and the EVOH coating solution was used instead of the PVA coating solution. The mass per unit area of the EVOH layer was 0.61 g/m². The surface roughness Sa of the surface of the EVOH layer was 0.08 μm.

Experimental Example 3

The EVOH layer (thickness: 1 μm) was formed on a surface of the OPP film B through Adhesive Resin ADMER by an extrusion method. Subsequently, the same procedure as in Experimental Example 1 was performed to obtain a layered body. The mass per unit area of the EVOH layer was 1.21 g/m². The surface roughness Sa of the surface of the EVOH layer was 0.08 μm.

Experimental Example 4

A layered body was obtained in the same manner as in Experimental Example 1, except that the ethylene-modified PVA coating solution was used instead of the PVA coating solution.

Experimental Example 5

A layered body was obtained in the same manner as in Experimental Example 3, except that an aluminum ingot was used as the SiO vapor deposition material and the inside of the chamber was set to an oxygen-containing atmosphere to thereby form an AlOx thin film (thickness: 10 nm) instead of the SiOx thin film. The mass per unit area of the EVOH layer was 1.21 g/m². The surface roughness Sa of the surface of the EVOH layer was 0.08 μm.

Experimental Example 6

A layered body was obtained in the same manner as in Experimental Example 4, except that a coating solution in which the mass ratio of the polyvinyl alcohol-based resin and the TEOS is 99.5/0.5 was used as the coating solution for forming the second polyvinyl alcohol-based resin layer.

Experimental Example 7

A layered body was obtained in the same manner as in Experimental Example 2, except that the second polyvinyl alcohol-based resin layer was not formed.

Experimental Example 8

A layered body was obtained in the same manner as in Experimental Example 2, except that the first polyvinyl alcohol-based resin layer was not formed.

Experimental Example 9

A layered body was obtained in the same manner as in Experimental Example 2, except that a polyurethane coating solution was used instead of the EVOH coating solution.

Experimental Example 10

A coating solution as described below was prepared in order to form a PVA layer containing Si (the second polyvinyl alcohol-based resin layer). That is, a solution obtained by hydrolyzing TEOS with an acid and a PVA aqueous solution were mixed, and finally, a silane coupling agent dissolved in water/isopropanol was mixed therewith. Thereby, a coating solution in which the mass ratio of the PVA, the TEOS, and the silane coupling agent was 20/70/10 was prepared. This coating solution was coated to the surface of the SiOx film and then dried to thereby form a PVA layer containing Si. Other than those, a layered body was obtained in the same manner as in Experimental Example 3. The mass per unit area of the EVOH layer was 0.61 g/m². The surface roughness Sa of the surface of the EVOH layer was 0.08 μm.

Experimental Example 11

A layered body was obtained in the same manner as in Experimental Example 5, except that the coating solution prepared in Experimental Example 10 was used as the coating solution for forming the second polyvinyl alcohol-based resin layer. The mass per unit area of the EVOH layer was 0.61 g/m². The surface roughness Sa of the surface of the EVOH layer was 0.08 μm.

Experimental Example 12

A layered body was obtained in the same manner as in Experimental Example 3, except that the PE film was used instead of the OPP film B and the coating solution prepared in Experimental Example 10 was used as the coating solution for forming the second polyvinyl alcohol-based resin layer. The mass per unit area of the EVOH layer was 0.61 g/m². The surface roughness Sa of the surface of the EVOH layer was 0.08 μm.

Experimental Example 13

A layered body was obtained in the same manner as in Experimental Example 2, except that the PVA coating solution was used instead of the EVOH coating solution and the coating solution prepared in Experimental Example 10 was used as the coating solution for forming the second polyvinyl alcohol-based resin layer. The mass per unit area of the PVA layer was 0.5 g/m². The surface roughness Sa of the surface of the PVA layer was 0.32 μm.

Experimental Example 14

A layered body was obtained in the same manner as in Experimental Example 3, except that the coating solution prepared in Experimental Example 6 was used as the coating solution for forming the second polyvinyl alcohol-based resin layer. The mass per unit area of the EVOH layer was 1.21 g/m². The surface roughness Sa of the surface of the EVOH layer was 0.08 μm.

TABLE 1

| | First layer | Second layer | | | Third layer | Fourth layer | | |
|---|---|---|---|---|---|---|---|---|
| | | — | Thickness | Logarithmic decrement | | — | Thickness | Indentation hardness |
| | | | (μm) | 100° C. | 125° C. | | | (μm) | (GPa) |
| Experimental Example 1 | PET | PVA | 0.5 | 0.05 | 0.05 | SiOx | PVA/TEOS = 6/4 | 0.3 | 0.8 |
| Experimental Example 2 | OPP | EVOH (coating) | 0.5 | 0.14 | 0.28 | SiOx | PVA/TEOS = 6/4 | 0.3 | 0.8 |
| Experimental Example 3 | OPP | EVOH (extrusion) | 1 | 0.15 | 0.24 | SiOx | PVA/TEOS = 6/4 | 0.3 | 0.8 |
| Experimental Example 4 | PET | Ethylene-modified PVA | 0.5 | 0.06 | 0.05 | SiOx | PVA/TEOS = 6/4 | 0.3 | 0.8 |
| Experimental Example 5 | OPP | EVOH (extrusion) | 1 | 0.15 | 0.24 | AlOx | PVA/TEOS = 6/4 | 0.3 | 0.8 |
| Experimental Example 6 | PET | Ethylene-modified PVA | 0.5 | 0.06 | 0.05 | SiOx | PVA/TEOS = 99.5/0.5 | 0.3 | 0.7 |
| Experimental Example 7 | OPP | EVOH (coating) | 0.5 | 0.14 | 0.28 | SiOx | — | — | — |
| Experimental Example 8 | OPP | — | — | — | — | SiOx | PVA/TEOS = 6/4 | 0.3 | 0.8 |
| Experimental Example 9 | OPP | Polyurethane | 0.5 | — | — | SiOx | PVA/TEOS = 6/4 | 0.3 | 0.8 |
| Experimental Example 10 | OPP | EVOH (extrusion) | 0.5 | 0.15 | 0.24 | SiOx | PVA/TEOS/SC = 20/70/10 | 0.3 | 0.86 |
| Experimental Example 11 | OPP | EVOH (extrusion) | 0.5 | 0.15 | 0.24 | AlOx | PVA/TEOS/SC = 20/70/10 | 0.3 | 0.86 |
| Experimental Example 12 | PE | EVOH (extrusion) | 0.5 | 0.15 | 0.24 | SiOx | PVA/TEOS/SC = 20/70/10 | 0.3 | 0.86 |
| Experimental Example 13 | OPP | PVA | 0.5 | 0.05 | 0.05 | SiOx | PVA/TEOS/SC = 20/70/10 | 0.3 | 0.86 |
| Experimental Example 14 | OPP | EVOH (extrusion) | 1 | 0.15 | 0.24 | SiOx | PVA/TEOS = 99.5/0.5 | 0.3 | 0.7 |

<Oxygen Transmittance Evaluation>

The oxygen transmittance of each layered body was measured using a method according to JIS-K7126-2 by MOCON OX-TRAN. The measurement conditions were set to 30° C. and 70 RH %. The oxygen transmittance after a boiling treatment was measured after each layered body was immersed in hot water set at 90° C. for 30 minutes. Results are shown in Table 2.

TABLE 2

| | Oxygen transmittance ($cc/m^2 \cdot day \cdot atm$) | |
|---|---|---|
| | Before boiling treatment | After boiling treatment |
| Experimental Example 1 | 0.1 | 0.5 |
| Experimental Example 2 | 0.05 | 0.5 |
| Experimental Example 3 | 0.08 | 0.4 |
| Experimental Example 4 | 0.1 | 0.4 |
| Experimental Example 5 | 0.1 | 0.5 |
| Experimental Example 6 | 0.03 | 0.3 |
| Experimental Example 7 | 0.5 | 3.0 |
| Experimental Example 8 | 1.2 | 2.0 |
| Experimental Example 9 | 3 | 4.0 |
| Experimental Example 10 | 0.2 | 0.4 |
| Experimental Example 11 | 0.1 | 0.9 |
| Experimental Example 12 | 0.3 | 0.9 |
| Experimental Example 13 | 0.3 | 0.6 |
| Experimental Example 14 | 0.3 | 0.5 |

As shown in Table 2, it was confirmed that the layered bodies of Experimental Examples 2, 3, 5, and 10 to 14 having the configuration of the present disclosure have excellent gas barrier properties although they are polyolefin-based layered bodies.

REFERENCE SIGNS LIST

10: substrate layer, 11: first polyvinyl alcohol-based resin layer, 12: Si or Al-containing thin film layer, 13: second polyvinyl alcohol-based resin layer, 14: sealant layer, 100: gas barrier layered body, 200, 300: packaging material.

The invention claimed is:

1. A gas barrier layered body comprising:
a substrate layer;
a first polyvinyl alcohol-based resin layer;
a Si or Al-containing thin film layer; and
a second polyvinyl alcohol-based resin layer, in stated order,
wherein
the substrate layer contains a polyolefin-based resin and has a thickness of 9 to 100 μm,
the first polyvinyl alcohol-based resin layer has a mass per unit area of 0.1 to 10 g/m², and a thickness of 0.05 to 5 μm,
the Si or Al-containing thin film layer is a vapor-deposited layer containing at least one of silicon oxide and aluminum oxide, and has a thickness of 5 to 80 nm, and
the second polyvinyl alcohol-based resin layer is a cured product of a raw material containing a polyvinyl alcohol-based resin and a silane compound, and an amount of the silane compound in the raw material is 0.3 to 5.0 parts by mass with respect to 1 part by mass of the polyvinyl alcohol-based resin, the second polyvinyl alcohol-based resin layer having a thickness of 0.05 to 2 μm,
a logarithmic decrement at 100° C. of a surface of the first polyvinyl alcohol-based resin layer on a side that is in contact with the Si or Al-containing thin film layer as measured by a rigid-body pendulum type physical property testing instrument is 0.20 or less and a logarithmic decrement at 125° C. is 0.30 or less, and an indentation hardness of a surface of the second polyvinyl alcohol-based resin layer as determined by a nanoindenter is 0.5 to 1.0 GPa.

2. The gas barrier layered body according to claim 1, wherein the second polyvinyl alcohol-based resin layer contains Si.

3. The gas barrier layered body according to claim 1, wherein a surface roughness Sa of the first polyvinyl alcohol-based resin layer on a side that is in contact with the Si or Al-containing thin film layer is 0.2 µm or less.

4. The gas barrier layered body according to claim 1, wherein the substrate layer is a propylene monopolymer layer.

5. A packaging material comprising:
the gas barrier layered body according to claim 1; and
a sealant layer provided on a surface of the gas barrier layered body.

6. The packaging material according to claim 5, wherein, the sealant layer is formed of a polyolefin-based resin, and
a content percentage of the polyolefin-based resin is 90% by mass or more based on a total mass of the packaging material.

7. A tube container comprising:
a tubular body portion having one blocked end; and
a spout portion attached to an other end of the tubular body portion,
wherein the tubular body portion is configured by a film including the gas barrier layered body according to claim 1 and a non-stretched polyolefin layer.

* * * * *

UNITED STATES PATENT AND TRADEMARK OFFICE
CERTIFICATE OF CORRECTION

| | | |
|---|---|---|
| PATENT NO. | : 12,071,288 B2 | Page 1 of 1 |
| APPLICATION NO. | : 17/630072 | |
| DATED | : August 27, 2024 | |
| INVENTOR(S) | : Takeshi Nishikawa et al. | |

It is certified that error appears in the above-identified patent and that said Letters Patent is hereby corrected as shown below:

On the Title Page

Item (30), Column 1, Line 1, delete "(WO)" and insert --(JP)--.

Signed and Sealed this
Fifteenth Day of October, 2024

Katherine Kelly Vidal
*Director of the United States Patent and Trademark Office*